(12) United States Patent
Hantschk et al.

(10) Patent No.: US 6,196,922 B1
(45) Date of Patent: Mar. 6, 2001

(54) UNIVERSAL JOINT COUPLING IN PARTICULAR ARRANGED ON A UNIVERSAL JOINT SHAFT OF AN ECCENTRIC WORM MACHINE

(75) Inventors: Günther Hantschk; Günter Franz, both of Waldkraiburg; Bernd Maier, Jettenbach, all of (DE)

(73) Assignee: Netzsch Mohnopumpen GmbH (DE)

( * ) Notice: Subject to any disclaimer, the term of this patent is extended or adjusted under 35 U.S.C. 154(b) by 0 days.

(21) Appl. No.: 08/377,753

(22) Filed: Jan. 24, 1995

(30) Foreign Application Priority Data

Feb. 10, 1994 (DE) .................................. 44 04 256

(51) Int. Cl.⁷ ...................................... F16D 1/24

(52) U.S. Cl. ............................... 464/16; 464/159

(58) Field of Search .............................. 464/16, 156, 158, 464/159

(56) References Cited

FOREIGN PATENT DOCUMENTS

| 0133325 | 2/1985 | (EP) . |
| 0297615 | 1/1989 | (EP) . |
| 04069409 | 6/1992 | (JP) . |

OTHER PUBLICATIONS

G. Niemann, D. Reister, M. Unterberger: Konstruieren im Maschinenbau. Erfahrungsangaben. Umdruck des Instituts für Allg. Gestaltungslehre und Maschinenelemente, Technische Hochschule München, 1957, Seite 11.

*Primary Examiner*—Donald P. Walsh
*Assistant Examiner*—William A. Rivera
(74) *Attorney, Agent, or Firm*—Baker Botts L.L.P.

(57) ABSTRACT

The universal joint coupling comprises a housing (20) in which a torque transmitting pair of coupling members is arranged between two axial force transmitting pairs of coupling members (22, 24), each of which includes a spherical cup (22) and a ball segment (24) supported therein. The torque transmitting pair of coupling members (26, 28) has grooves which are arranged in two concentric rows and are defined by gaps in an internal gear ring (26) fitted into the housing (20), or an external toothing (28). They cooperate for torque transmission with counter-acting bodies, the profile of which matches the groove profile. Both the external toothing (28) and the ball segments (24) form part of a hub (16). At least the spherical cup (22) of the axial force transmitting pair of coupling members (22, 24) which is higher loaded during normal operation, and the internal gear ring (26), on the one hand, and on the other hand the internal gear ring (26) and the hub (16) are connected to each other such that their positions relative to each other resulting after having assembled the universal joint coupling for the first time can be reproduced clearly and reliably thereby increasing the service life of the universal joint coupling.

15 Claims, 5 Drawing Sheets

Figure 1:
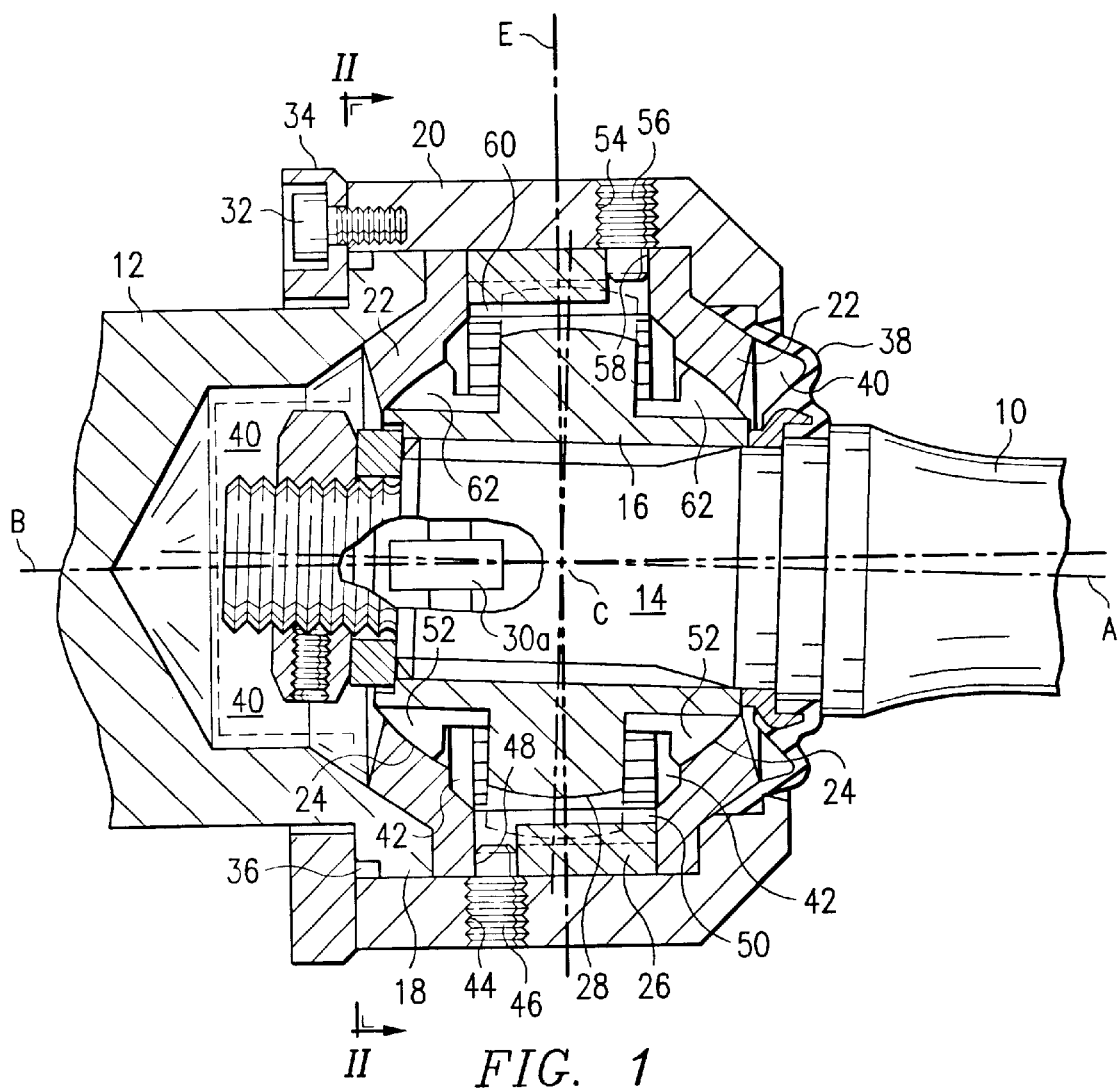

UNIVERSAL JOINT COUPLING IN PARTICULAR ARRANGED ON A UNIVERSAL JOINT SHAFT OF AN ECCENTRIC WORM MACHINE

The invention relates to a universal joint coupling according to the entering clause of claim 1.

A universal joint of this kind has been known from EP 0 297 615 B1 the disclosure of which is expressly incorporated herein by reference. In some cases it has been found with universal joint couplings of the kind described therein that, following a disassembly and the subsequent re-assembly, the universal joint has but a short remaining service life. De-mounting and subsequently re-mounting the universal joint coupling may be required for instance in the course of maintenance work. The universal joint coupling of an eccentric worm pump, as a rule, has to be disassembled and subsequently re-assembled regularly when the rotor of the eccentric worm is exchanged.

In a printed publication of the "Institut für allgemeine Gestaltungslehre und Maschinenelemente der TH München" (Institute for general design and machine elements at the Technical University Munich) which dates back to 1957 and refers to experiences gained in the construction of machine elements, it is mentioned that whenever machined elements have to be assembled, a design engineer should ask himself whether a certain position of the elements relative to each other has to be defined. Said printed publication does not refer to universal joint couplings of the above-mentioned kind.

The object of the invention is to provide a universal joint coupling of the kind mentioned above whose service life is increased compared to prior art universal joint couplings under comparable operating conditions.

According to the present invention, said object is achieved with a universal joint coupling comprising the features set out in claim 1. The invention is based on the finding that wear of a universal joint coupling of the above-mentioned kind can be particularly aggravated following a disassembly of the universal joint because the spherical cup(s) and the internal ring gear, as well as the internal ring gear and the hub normally occupy upon re-assembly a position with respect to each other differing from the positioning of the first assembly of the universal joint coupling. The position of the named parts which is different compared to the first positioning has as consequence that the universal joint coupling has to undergo a running-in again. However, if the connection in particular of the spherical cup being higher loaded during normal operation, on the one hand, and on the other hand the connection of the internal gear ring and the hub are designed such that, after a disassembly of the universal joint, the original positioning results automatically when the universal joint is assembled again, renewed running-in does no longer exist and the service life of the universal joint coupling is increased.

The clear and reliably reproducible positioning demanded according to the present invention of spherical cup(s) and internal gear ring, on the one hand, as well as on the other hand of internal gear ring and hub guarantees that the same spherical surfaces defined by the ball segments and spherical cups, respectively, always cooperate upon a re-assembly of the joint.

According to the invention, it has therefore been found that a decisive factor resides in designing the connection of the named parts such that, after disassembly of the joint, they can be re-assembled only such that they occupy their original positions.

According to one embodiment of the universal joint coupling according to the present invention, in which the lubricant passages are defined by omitting teeth of the torque transmitting pair of coupling members, for instance by omitting two teeth of the external toothing, and in which the grooves formed as lubricant passages have a depth less than the corresponding tooth depth, this is achieved in connection with the internal gear ring and the hub in that the torque transmitting pair of coupling members has an uneven number of teeth. In this manner it is guaranteed that the lubricant passages have an uneven circumferential spacing which permits the joining of external toothing and internal gear ring in only one position. If the torque transmitting pair of coupling members has an even number of teeth, the clear positioning of internal gear ring and hub can be achieved according to said embodiment in that the number of teeth located, as seen in clockwise direction, between the lubricant passages formed by the omission of counter-acting bodies, differs by at least two teeth from the number of teeth located, as seen in counterclockwise direction, between the lubricant passages. Contrary to the universal joint coupling known from EP 0 297 615 B1, the lubricant passages are thus not located substantially directly opposite each other, but are arranged so as to be offset by at least one tooth.

According to another embodiment of the universal joint coupling according to the present invention, the clearly reproducible position, or positioning, of internal gear ring and hub is achieved by an irregular pitch of the torque transmitting pair of coupling members. Said irregular pitch again has as consequence that the hub with the external toothing provided thereon and the internal gear ring can be assembled in only one position.

The clear position of at least the spherical cup being higher loaded during normal operation and of the internal gear ring with respect to each other is achieved according to an embodiment of the universal joint coupling according to the present invention by means of connecting the internal gear ring and the corresponding spherical cup by a material bond. The material bond between the corresponding spherical cup and the internal gear ring is preferably effected by an adhesive. The material bond can be obtained, however, also by brazing, welding, or by other connection techniques with which a material bond is achieved.

According to another embodiment of a universal joint coupling according to the present invention, the clear position of internal gear ring and spherical cup is effected by a non-positive connection of the named elements, which is achieved for instance by shrinking-on the internal gear ring to the end region of the corresponding spherical cup.

According to still another embodiment of the universal joint coupling according to the present invention, the clearly reproducible position of internal gear ring and at least the spherical cup being higher loaded during normal operation, with respect to each other, is achieved by at least two feather keys of different widths which are arranged in the housing and effect a positive connection between the spherical cup and the internal gear ring. The different widths of the at least two feather keys result in that the spherical cup and the internal gear ring can be joined in one single position only. Alternatively, this can be achieved also by at least two feather keys of same width which can be arranged in the housing and which have an uneven circumferential spacing. According to another alternative, the at least two feather keys may be arranged in the housing such that they have a common line of symmetry in a cross section normal to the longitudinal axis of the housing which is displaced in axis-parallel relation with respect to a straight line extending through the center of the universal joint coupling. The said arrangement as well permits joining of the spherical cup and internal gear ring in one single position only. The aforementioned arrangements and constructions, respectively, of feather keys may be combined, however this is not necessary to achieve a clear positioning of the corresponding spherical cup and the internal gear ring with respect to each other.

According to still another embodiment of the universal joint coupling according to the present invention, at least the spherical cup being higher loaded during normal operation is clearly reproducibly brought in a position with respect to the internal gear ring in that one of the closure members engages the associated recess extending radially through the internal gear ring, said recess being arranged such that, based on its cross section, at least approximately half of it is located in the internal gear ring and in the corresponding spherical cup. In this manner as well, a clear and reliably reproducible positive connection is established between the spherical cup and the internal gear ring.

When the clear positioning of spherical cup and internal gear ring is achieved by means of a non-positive connection or the connection by a material bond, it is preferred to center at least the spherical cup being higher loaded during normal operation in the end face of the internal gear ring facing the spherical cup. An exact centering of the spherical cup with respect to the internal gear ring is thereby achieved, as the spherical cup is centered independent of the housing of the universal joint coupling. The exact centering results in an improved running-in behavior of the universal joint coupling, as it is possible to keep at a low level especially the wear of the spherical surfaces defined by the ball segments and the spherical cup which occurs during running-in. Thereby the service life of the universal joint coupling according to the present invention is further prolonged. It is preferred to effect the centering of at least the spherical cup being higher loaded during normal operation in the end face of the internal gear ring facing said spherical cup in that a circumferentially extending collar axially projecting from said end face embraces the end section of the spherical cup which faces said collar.

Centering at least the spherical cup being higher loaded during normal operation only in the end face of the internal gear ring that it faces, by means of the collar axially projecting from said end face, further allows to connect the internal gear ring preferably for instance to the head of a rotor of an eccentric worm machine, or to a drive shaft by coupling the collar of the internal gear ring and the rotor or drive shaft directly to at least one feather key arranged in the housing. Compared to conventional arrangements in which the feather key(s) extends(extend) from the internal gear ring through the spherical cup into the rotor head or the drive shaft, the feather key may be designed shorter here which improves the connection between internal gear ring and rotor head and drive shaft, respectively, and the flux of force through the feather key connection.

It is true that the described centering of at least the spherical cup being higher loaded during normal operation in the end face of the internal gear ring which it faces is used preferably together with a connection by a material bond or a non-positive connection between the corresponding spherical cup and the internal gear ring, however it is possible to use said kind of centering being independent of the housing advantageously also by itself, in other words without the connection by a material bond or the on-positive connection between the corresponding spherical cup and the internal gear ring.

Figure 2:
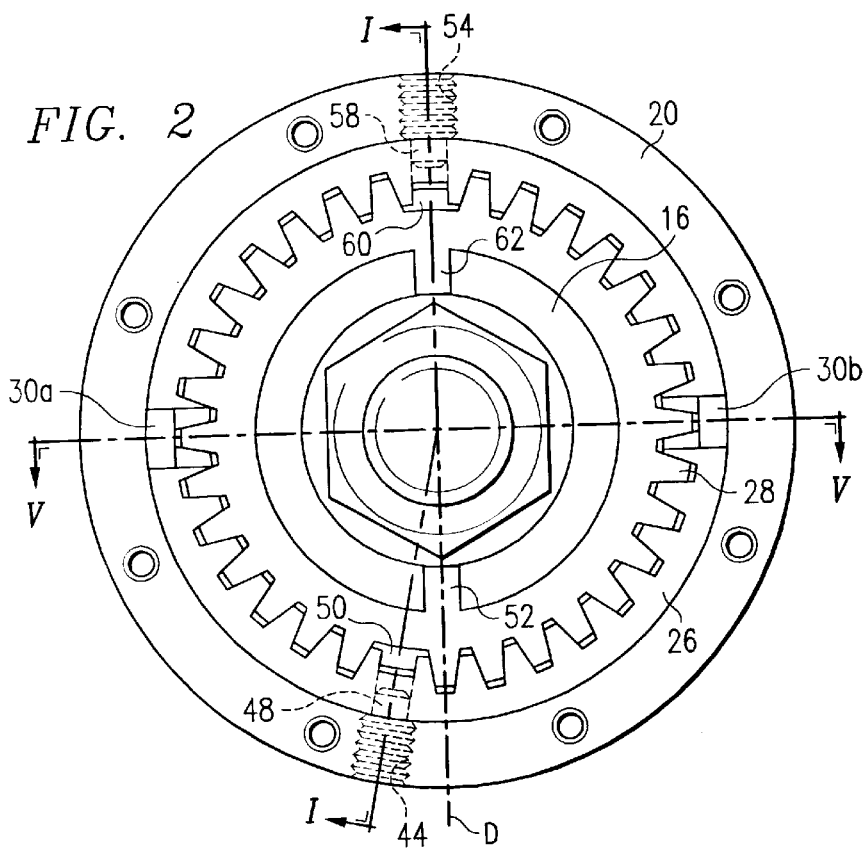
Figure 3:
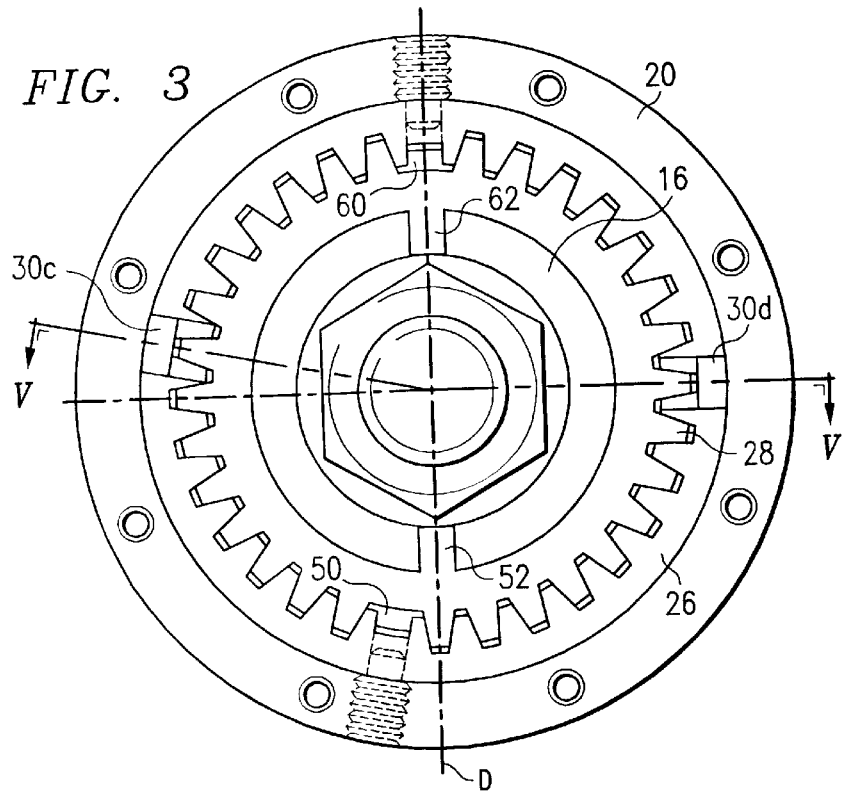
Figure 4:
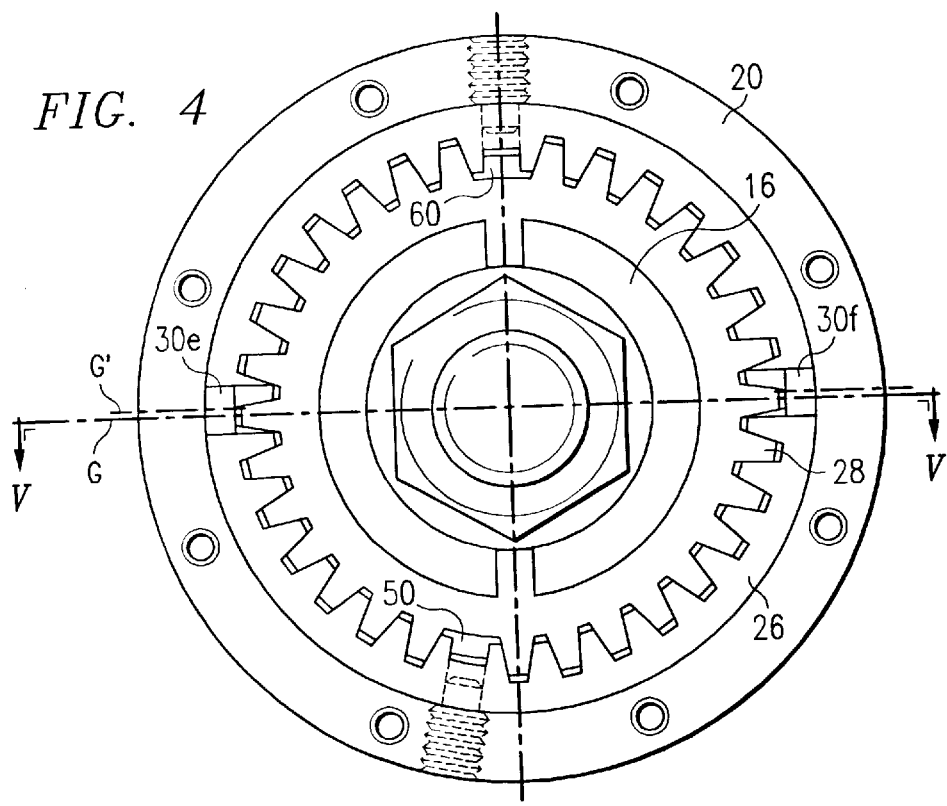
Figure 5:
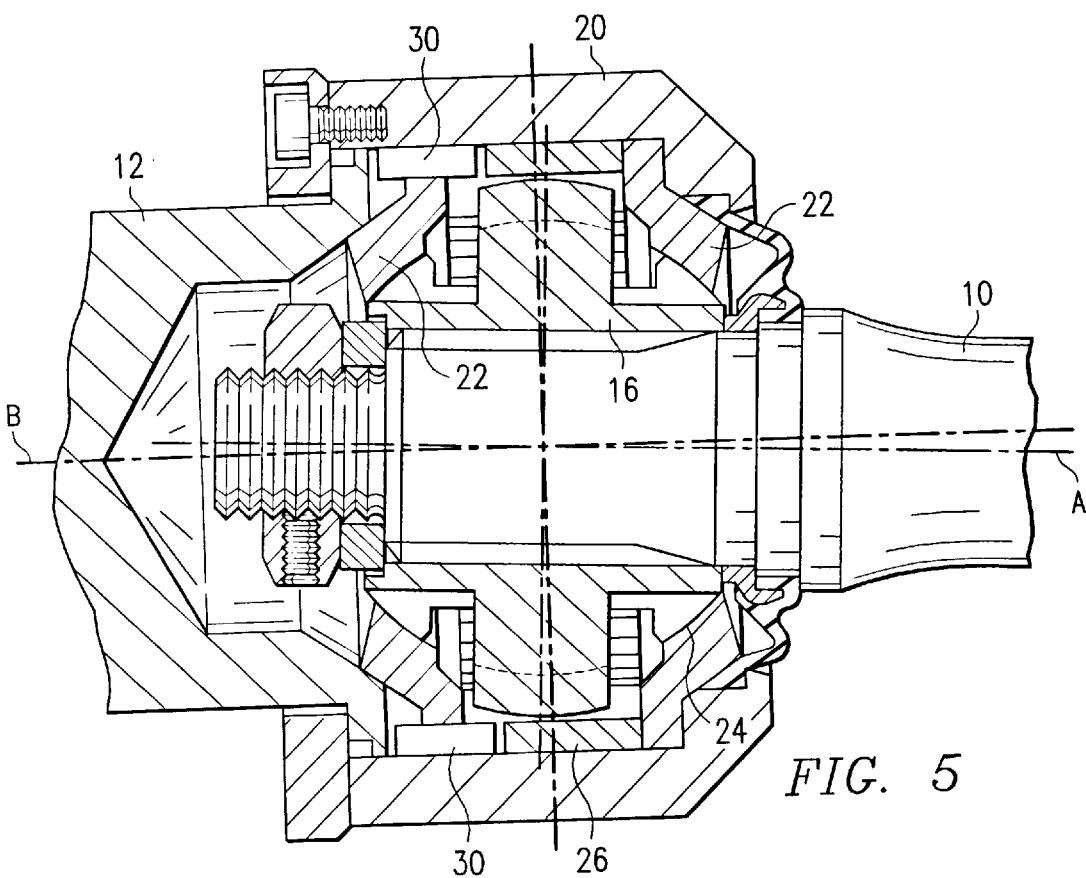
Figure 6:
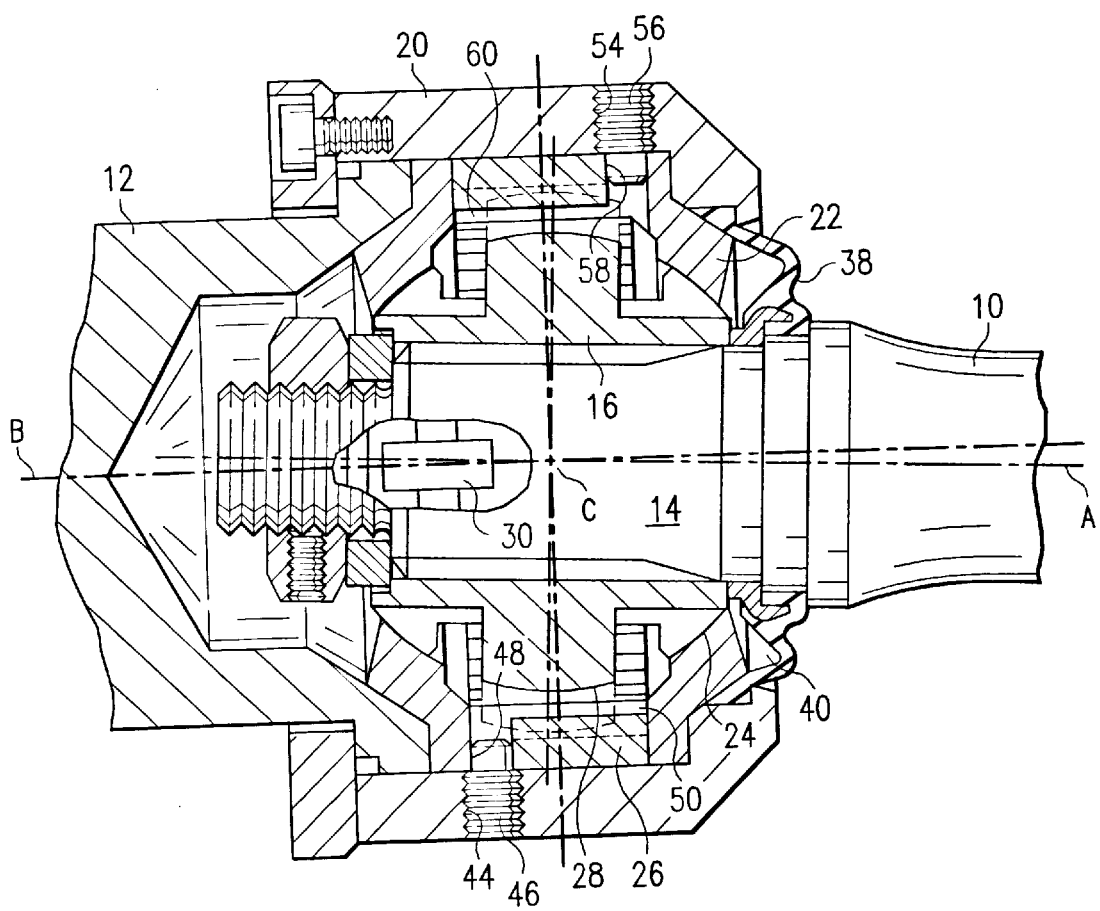
Figure 7:
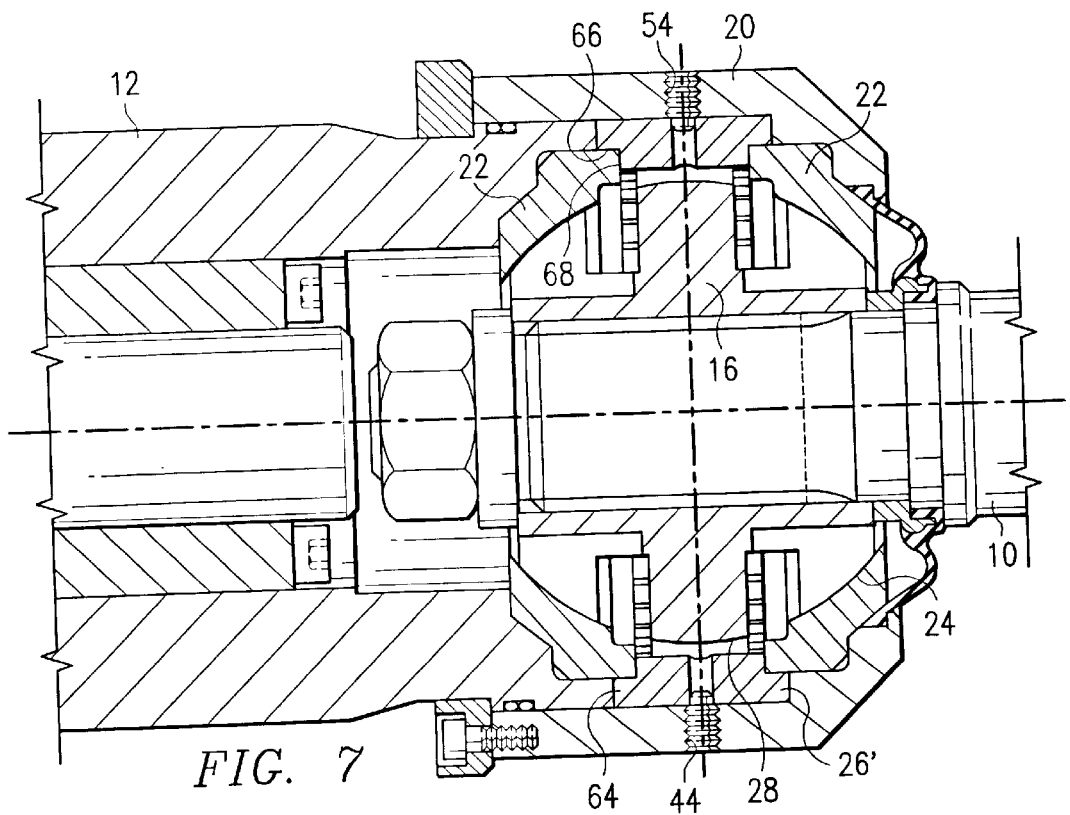
Figure 8:
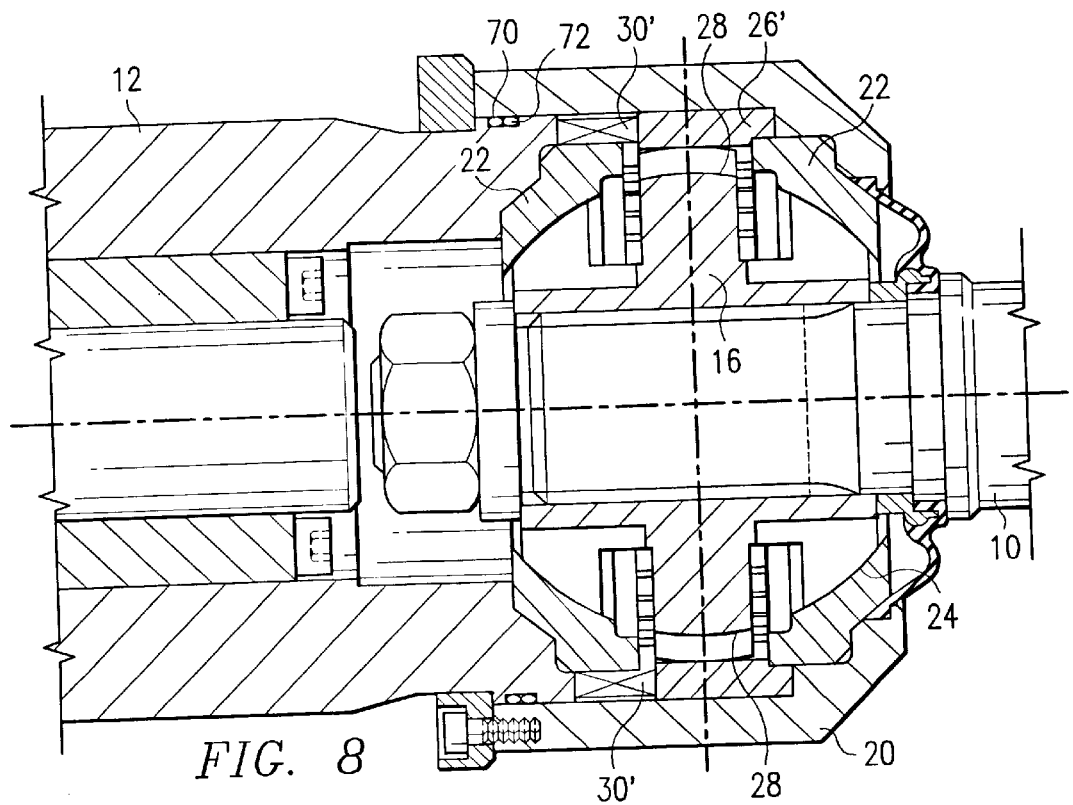

A number of embodiments of the present invention will be described with further details below, with reference to diagrammatic drawings, in which:

FIG. 1 is an axial section of a universal joint coupling of an eccentric worm pump, FIG. 2 is view II—II in FIG. 1 with detached rotor, FIG. 3 is a view corresponding to that of FIG. 2 of a modified embodiment, FIG. 4 is a view corresponding to that of FIG. 2 of another modified embodiment, FIG. 5 is section V—V in FIG. 2, FIG. 3 and FIG. 4, FIG. 6 is an axial section of another embodiment of a universal joint coupling of an eccentric worm pump, FIG. 7 is an axial section of still another embodiment of a universal joint coupling of an eccentric worm pump, FIG. 8 is an axial section revolved by 90° with respect to FIG. 7 of the universal joint coupling in FIG. 7.

The universal joint coupling illustrated in FIG. 1 connects one end of a universal joint shaft 10 to one end of a worm-shaped rotor 12 of an eccentric worm pump. The non-illustrated end of the universal joint shaft 10 is connected to a stationarily supported drive shaft by means of a second, substantially identical universal joint coupling.

A pin 14 having a multi-groove profile is provided at the illustrated end of the universal joint shaft 10, and a substantially spherically shaped hub 16 is secured thereto. A collar 18 to which a housing 20 is fastened is formed at the end of the rotor 12.

The geometrical axes A and B of the universal joint shaft 10 and the rotor 12, respectively, intersect at a point C being the center point of the entire universal joint coupling. In operation, axis A of universal joint shaft 10 moves on a cone-shaped shell surface whose tip constitutes the center of the second universal joint coupling (not illustrated); axis B of rotor 12, however, moves on a cylindrical shell surface. In every position of the two axes A and B, their common plane is a diametral plane D (cf. FIG. 2). A center plane E normal to axis B of rotor 12 extends through the center C.

Two spherical cups 22 are centered inside the housing 20 with respect to the rotor 12 and are arranged symmetrically with respect to the center plane E. Together with one ball segment 24, respectively, formed at the hub 16, the two spherical cups 22 constitute an axial force transmitting pair of coupling members 22, 24, respectively. The engaging surfaces of spherical cups 22 and ball segments 24 are spherical sliding surfaces having the center C.

Between the two spherical cups 22 an internal gear ring 26 is secured in the housing 20 centrically with respect to axis B and symmetrically with respect to the center plane E. Together with an external toothing formed at the hub 16 between the two ball segments 24, the internal gear ring 26 forms a torque transmitting pair of coupling members 26, 28. Feather keys 30a, 30b arranged in the housing 20 prevent relative rotations between the housing 20, the spherical cups 22, and the internal gear ring 26.

To ensure, with respect to the internal gear ring 26, a clear and reliably reproducible position of the left spherical cup 22 in FIG. 1 which during normal operation of the eccentric worm pump is higher loaded than the right spherical cup 22 in FIG. 1, the two feather keys 30a, 30b have different widths, as can be seen from FIG. 2. The left spherical cup 22 in FIG. 1 and the internal gear ring 26 can be assembled in one single position only despite the feather keys 30a, 30b being arranged at an even circumferential distance to each other.

FIG. 3 illustrates a modified embodiment of the universal joint coupling of FIG. 1 and FIG. 2, in which the two feather keys 30c, 30d do have the same width, but have an uneven circumferential spacing, in other words, the two feather keys 30c, 30d are not arranged directly opposite each other, as illustrated in FIG. 2, but are to be offset at an angle in the drawing plane with respect to each other. Thereby it is achieved as well that the left spherical cup 22 in FIG. 1 and the internal gear ring 26 can be assembled in one single position only.

Still another modified embodiment of the universal joint coupling is shown in FIG. 4, in which the two feather keys 30e, 30f, though they have the same width and are arranged directly opposite each other, are displaced to the same side in axis-parallel relation with respect to a straight line G extending through the center C. From FIG. 4 it can be seen that the two feather keys 30e, 30f have a common line of symmetry G' extending parallel to the straight line G. Said off-center arrangement of the two feather keys 30e, 30f with respect to the straight line G, to the same side, effects as well that the left spherical cup 22 in FIG. 1 and the internal gear ring 26 can be assembled in one single position only.

From FIG. 5 it can be seen that the two feather keys 30 provide a positive engagement of the internal gear ring 26, the left spherical cup 22 in FIG. 1, and the rotor 12.

As can best be seen from FIG. 1, the entire universal joint coupling is axially held together by screws 32 by which a ring 34 extending over the collar 18 is secured to the housing 20. An annular seal 36 is clamped between the ring 34 and the collar 18. At the other, right-hand side in FIG. 1 of the universal joint coupling, a sealing member 38 seals the housing 20 vis-à-vis the universal joint shaft 10.

Inside the housing 20, one external hollow space 40, respectively, is defined axially outside the two spherical cups 22. The two hollow spaces 40 are further defined by one end face, respectively, of the hub 16. The left hollow space 40 in FIG. 1 is additionally defined by the rotor 12, while the right hollow space 40 in FIG. 1 is additionally defined by the sealing member 38. An annular hollow space 42 is arranged axially inside each one of the two spherical cups 22.

Following the assembly and prior to putting the universal joint coupling into operation, each of the hollow spaces 40 and 42 is completely filled with a lubricant. To this end, the housing 20 is provided with a lubricant inlet 44 at the lower side with respect to the position illustrated in FIG. 1, which is formed by a radial tap hole and tightly closed by a screwed-in closure member 46. The closure member 46 has a pin-like end which is the radial inner one with respect to the housing 20 and which engages a radial recess 48 of the internal gear ring 26. A lubricant passage 50 extending parallel to the the axis B of the rotor 12 follows the recess 48, said passage 50 being formed by a gap between two teeth of the internal gear ring 26. One tooth has been omitted at the external toothing, in the region of said gap, such that the lubricant passage 50 is held completely open. The gap defining the lubricant passage 50 has a height in radial direction which is less than the depth of the teeth of the external toothing 28. Thus it is prevented that the internal gear ring 26 can be joined to the external toothing 28 of the hub 16 in such a way that one of the teeth of the external toothing 28 extends into the lubricant passage 50.

The two ends of the lubricant passage 50 are directly connected to a radially outer area of each of the two annular hollow spaces 42, respectively. Two return passages 52 (cf. FIG. 2) located in the diametral plane D start from a radially inner reagion of each one of the two annular hollow spaces 42 and are formed in the corresponding ball segment 24, and open in one of the axially outer hollow spaces 40.

An air outlet 54 is arranged on the upper side of the housing 20 in FIG. 1 which is formed by a radial tap hole of same size as the lubricant outlet 44 and is also tightly closed by a screwed-in closure member 56. The air outlet 54 is via a recess 48 connected to that annular hollow space 42 which does not have a direct radial connection with the lubricant inlet 44. The two annular hollow spaces 42 communicate through an air outlet and lubricant passage 60. Another pair of return passages 62 is arranged in the same diametral plane D as said air outlet and lubricant passage 60 and connects one of the axial outer hollow spaces 40, each, to the adjacent annular hollow space.

To guarantee a clear and reliably reproducible relative position of the hub 16 and the internal gear ring 26, the lubricant inlet 44, the radial recess 48, and the lubricant passage 50 are not arranged on the same diametral plane D as the air outlet 54, the associated recess 58 thereof and the lubricant passage 60 (cf. FIG. 2). Instead, as illustrated in FIG. 2, the lubricant passages 50 and 60 are arranged to be offset with respect to each other by at least one tooth. Whereas an arrangement of the lubricant passages 50 and 60 on the same diametrical plane D is not possible anyway when the number of teeth of the torque transmitting pair of coupling member 26, 28 is uneven, care has to be taken when the number of teeth of the torque transmitting pair of coupling members 26, 28 is even that the number of teeth between the lubricant passages 50 and 60 is not the same, but differs by at least two teeth. This ensures that the hub 16 and the internal gear ring 26 can be assembled in one single position only. It is mentioned, in this connection, that FIG. 1 shows the axial section I—I of FIG. 2.

FIG. 6 illustrates another possibility to achieve a positive connection between one of the spherical cups 22 and the internal gear ring 26, said positive connection ensuring a clear relative positioning of the corresponding spherical cup 22 and the internal gear ring 26. Deviating from the embodiment of the universal joint coupling illustrated in FIG. 1, the air outlet 54 and the associated recess 58 are arranged such that the recess 58, based on its cross section, does not only extend through the internal gear ring 26, but also through a portion of the right spherical cup 22 in FIG. 6, in other words air outlet 54 and recess 58 are with respect to FIG. 1 displaced to the right by half of their respective diameters, with the result that the right spherical cup 22 and the internal gear ring 26 can be joined in one single position only. This structural measure can be used with the same effect at the lubricant inlet 44 and the associated recess 48 thereof.

FIG. 7 shows a modified embodiment of the universal joint coupling in which the clear relative positioning at least of the left spherical cup 22 in FIG. 7 which is higher loaded during normal operation and the internal gear ring 26' is achieved not by a positive engagement but by a non-positive engagement or connection by a material bond. The internal gear ring 26' is to this end provided with a circumferentially extending collar 64 axially projecting from its end face facing the left spherical cup 22 and embracing an end section of the left spherical cup 22 whereby the latter is centered with respect to the ring 26'. For providing a non-positive engagement, the internal gear ring 26' is with its collar 64 shrunk-on to the end section of the spherical cup 22 facing said collar 64. For providing a connection by a material bond, the spherical cup 22 is, at the side of its shell surface, bonded to the internal gear ring 26' at 66 and/or at the end face at 68.

To simplify manufacture it is provided according to said embodiment that both the lubricant inlet 44, and the air outlet 54 and the associated recesses are arranged on a common circumferential line. FIG. 8 shows that the embodiment illustrated in FIG. 7 offers the possibility to connect the internal gear ring 26' directly to the rotor 12 for positive engagement by means of shorter feather keys 30'.

Deviating from the embodiment illustrated in FIG. 1, a seal is provided between the housing 20 and the rotor 12 which consisits of two O-rings 70 and 72 arranged side-by-side in a circumferential groove of the rotor 12. This kind of seal permits an adaptation of the material of the O-ring 70 to the medium to be conveyed by the eccentric worm pump, while the material of the O-ring 72 may be adapted to the lubricant filled in to the universal joint coupling.

What is claimed is:

1. A universal joint coupling, especially for use on a universal joint shaft of an eccentric worm machine, comprising:

two axial force transmitting pairs of coupling members, each such pair including a spherical cup and a ball segment supported therein, one of said two axial force transmitting pairs of coupling members being subject to a higher load than the other of said two axial force transmitting pairs of coupling members when the universal joint coupling is operating;

a torque transmitting pair of coupling members arranged between the two pairs of axial force transmitting coupling members, the torque transmitting pair of coupling members including an outer ring member having internal teeth defining gaps and an inner ring having external teeth defining gaps, the teeth of each ring meshing with the gaps of the other ring so as to transmit torque;

a housing enclosing the said pairs of coupling members and including an annular cavity between each of the two axial force transmitting pairs of coupling members and the torque transmitting pair of coupling members;

a lubricant inlet on the housing communicating with one of the annular cavities and an air outlet on the housing communicating with the other of the annular cavities, the lubricant inlet and the air outlet each having a closure member;

wherein at least one tooth is omitted on one of the rings near the lubricant inlet, thereby leaving a gap on the other ring open to form a first lubricant passage between the two annular cavities;

wherein at least one tooth is omitted on one of the rings near the air outlet, thereby leaving a gap on the other ring open to form a second lubricant passage between the two annular cavities;

wherein the inner ring and the ball segments are integral parts of a hub;

wherein at least the spherical cup of said one axial force transmitting pair operating under said higher load is joined to said outer ring by means that clearly and reliably ensures that only one position of said spherical cup relative to the outer ring is possible upon initial assembly and upon each reassembly after a disassembly; and wherein the teeth and gaps of the inner and outer rings are arranged such that the hub is capable of being assembled to the outer ring in only one position of the inner ring relative to the outer ring;

whereby following a disassembly and subsequent reassembly of the universal joint coupling, at least the spherical cup of said one axial force transmitting pair that is subject to said higher load is engaged with the corresponding ball segment in the same position as existed upon initial assembly of the universal joint coupling.

2. A universal joint coupling as claimed in claim 1 wherein the lubricant inlet and the air outlet are aligned radially with respective recesses in the outer ring that open into the respective first and second lubricant passages.

3. A universal joint coupling as claimed in claim 1 wherein two teeth of the outer ring are omitted and the two gaps thereby formed as the first and second lubricant passages have depths which are less than the heights of the teeth of the inner ring.

4. A universal joint coupling as claimed in claim 1 wherein each of the rings of the torque transmitting pair of coupling members has an uneven number of teeth.

5. A universal joint coupling as claimed in claim 1 wherein each of the rings of the torque transmitting pair of coupling members has an even number of teeth and the number of teeth located between the first and second lubricant passages on one lateral side of the hub differs by at least two from the number of teeth located between said first lubricant second lubricant passages on the other lateral side of the hub.

6. A universal joint coupling as claimed in claim 1 wherein the pitches between at least two adjacent teeth of the rings of the torque transmitting pair of coupling members are different from the pitches of the remaining teeth.

7. The universal joint coupling as claimed in claim 1 wherein the spherical cup of the axial force transmitting pair of coupling members operating under said higher load during normal operation is connected to the outer ring by a bond selected from the group consisting of an adhesive, a solder, a weldment and a shrink-fit.

8. The universal joint coupling as claimed in claim 1 wherein the spherical cup of the axial force transmitting pair of coupling members operating under said higher load during normal operation is connected to the outer ring by a plurality of mechanical coupling elements.

9. The universal joint coupling as claimed in claim 8 wherein the spherical cup of the axial force transmitting pair of coupling members operating under said higher load during normal operation is connected to the outer ring by means of at least two feather keys of different widths.

10. The universal joint coupling as claimed in claim 8 wherein the spherical cup of the axial force transmitting pair of coupling members operating under said higher load during normal operation is connected to the internally toothed ring by means of at least two feather keys arranged in the housing and having an uneven circumferential spacing.

11. The universal joint coupling as claimed in claim 8 wherein the spherical cup of the axial force transmitting pair of coupling members operating under said higher load during normal operation is connected to the outer ring by means of at least two feather keys arranged in the housing and having a common line of symmetry in a cross section normal to the longitudinal axis of the housing, the line of symmetry being parallel to and spaced apart from a straight line extending through the center of the universal joint coupling.

12. The universal joint coupling as claimed in claim 1 wherein the spherical cup of the axial force transmitting pair of coupling members operating under said higher load during normal operation is mechanically connected to the outer ring by one of the closure members, part of which is received in the recess in the outer ring and part of which is received in a recess in the spherical cup.

13. The universal joint coupling as claimed in claim 1 wherein a portion of the spherical cup of the axial force transmitting pair of coupling members operating under said higher load during normal operation is received radially within and centered by a collar portion of the outer ring.

14. The universal joint coupling as claimed in claim 13 wherein at least one feather key connects the collar of the outer ring to a rotatable member of the universal joint coupling.

15. The universal joint coupling as claimed in claim 14 wherein the spherical cup of the axial force transmitting pair of coupling members operating under said higher load during normal operation is connected to the outer ring by a bond selected from the group consisting of an adhesive, a solder, a weldment and a shrink-fit.

* * * * *